United States Patent [19]

Numakura et al.

[11] Patent Number: 5,057,931

[45] Date of Patent: Oct. 15, 1991

[54] TONAL CONVERSION METHOD OF PICTURES FOR PRODUCING REPRODUCED PICTURES FREE OF COLOR-FOG

[75] Inventors: Takashi Numakura; Iwao Numakura, both of Tokyo, Japan

[73] Assignee: Yamatoya & Co., Ltd., Tokyo, Japan

[21] Appl. No.: 481,055

[22] Filed: Feb. 16, 1990

[30] Foreign Application Priority Data

Aug. 19, 1989 [JP] Japan .................................... 212118

[51] Int. Cl.$^5$ ...................... H04N 1/23; H04N 1/387; H04N 1/46
[52] U.S. Cl. .................................. 358/298; 358/456; 358/80
[58] Field of Search .................. 358/298, 456, 75, 80, 358/448, 455, 461, 443

[56] References Cited

U.S. PATENT DOCUMENTS

| | | | |
|---|---|---|---|
| 4,811,108 | 3/1989 | Numakura | 358/298 |
| 4,833,546 | 5/1989 | Numakura | 358/198 |
| 4,924,323 | 5/1990 | Numakura | 358/298 |
| 4,956,718 | 9/1990 | Numakura | 358/298 |

Primary Examiner—Benjamin R. Fuller
Assistant Examiner—Scott A. Rogers
Attorney, Agent, or Firm—Wenderoth, Lind & Ponack

[57] ABSTRACT

A tonal conversion method of pictures useful upon producing reproduced pictures such as halftone pictures free of color-fog from color-fogged color original pictures of continuous tone. The tonal conversion is conducted in a manner that objective data relating to color-fog from a color original picture having color-fog thereon are obtained using undistorted X-axis pictorial information values for respective C, M and Y color plates obtained from the corresponding density values on the D axis in accordance with corresponding density characteristic curves of R, G, B photosensitive emulsion layers of a color film used upon photographing the original color pictures, thereby providing reproduced pictures free of color-fog by using a specific tonal conversion formula.

4 Claims, 5 Drawing Sheets

Logarithmic value of light exposure (lux/sec.)

TONAL CONVERSION METHOD OF PICTURES FOR PRODUCING REPRODUCED PICTURES FREE OF COLOR-FOG

FIELD OF THE INVENTION

This invention relates to a tonal conversion method of pictures, which is indispensable upon producing various types of reproduced pictures such as printed pictures in halftone, reproduced digital pictures, etc. from original pictures of continuous gradation.

More specifically, this invention relates to a tonal conversion method of a picture making use of a technique which is capable of effectively removing color-fog, said color-fog inevitably occurring more or less on any color original picture, and is incorporated in a production process of a reproduced picture of one of various types. The tonal conversion method is useful primarily in color-separation work using a color scanner in the field of electronic plate-making or in processing of pictorial information in other field.

BACKGROUND OF INVENTION

It is well known that various reproduced pictures are produced from color originals of continuous tone by conducting various tonal conversion of pictures, such as halftone gradational representation (multi-value area gradational representation) as seen in printing, binary-value gradational representation as seen in ink-jet recording, and direct density gradational representation as seen in sublimed pigment thermal transfer recording. There are common problems and demands in the conventional tonal conversion technique of pictures. They will be described hereinafter taking printing work as a representative example in picture reproduction field.

In the electronic plate-making process, color-separation work is carried out by using a color scanner or a total scanner (hereinafter simply called "scanner separation") which is highly advanced in mechatronics. It is the present state of art that no rational tonal conversion theory of pictures has yet been established for conversion of color originals of continuous tone into printed pictures in halftone. Practical color-separation work is heavily dependent on the experiences and perception of operators, while expensive color scanners highly advanced in mechatronics are used therein as working means, as previously described. The same situation can be found where a color original has non-standard picture quality, that is, the density range of a color original is removed from that of a color original having a standard picture quality, for example over- or under-exposed, or a color original is color-fogged. Concerning color-fog in particular, actual color originals are all color-fogged more or less, but no rational technique has yet been established for removing the color-fog. When an operator attempts to remove color-fog through color separation by using a scanner, the operator has to perform the work on a trial and error basis under the circumstances.

A scanner which requires a large investment is thought to actually have a high operation rate in the light of its sophisticated technology. However, its actual operation rate is still on an order as low as about 30% to 40% on average. Consequently, this prevents improvements of the current working conditions that workers are customarily forced to work overtime works many hours, even beyond midnight. Moreover, this also prevents the enhancement of each company's financial status and the competitive power.

OBJECT AND SUMMARY OF THE INVENTION

The present inventors have a view that a consideration should be paid on the technique which enables rational conversion of density gradation of each picture element of pictures rather than the color correction technique which is deemed to be important in the conventional technique in order to produce a reproduced picture with tonal reproducibility (reproducibility of gradation and color tone) from an original picture of one of various types, more over a reproduced picture having a desired tone. Namely, the present inventors have a view that a reconsideration should be given to the conventional technique in the art where color correction technique which is readily analyzed in a scientific manner is regarded to be more important than a tonal conversion in the density range of pictures in the process of reproduction of color printed pictures.

Based on the above view, the present inventors have proposed a tonal conversion method wherein a specific tonal conversion formula is adopted, by which the tonal conversion of pictures can be scientific and rational (U.S. Pat. Nos. 4,811,108; 4,833,546; 4,924,323; and 4,956,718).

The present inventors have also pointed out the following problem and proposed a countermeasure therefor. That is to say, a camera subject (substantial picture or actual scene) should be a practical object of a reproduced picture.

However, in the conventional picture processing, pictorial information obtained from a camera subject is first stored on or in a recording medium such as a photosensitive material, photoelectric material, photoconductive material, etc., then the pictorial information stored on or in the recording medium is processed, in general. Accordingly, the picture information of the medium picture is departed from actual picture information of the camera subject. In other words, the conventional tonal conversion for production of printed pictures starts from density values determined on the basis of a density characteristic curve of a photosensitive emulsion, which is represented on a D-X rectangular coordinate system where density values and logarithmic values of exposure quantities are plotted along the axis of ordinates (D axis) and the axis of abscissas (X axis), respectively. Consequently, the practical pictorial information values such as light exposure, light quantity, etc., which are considered to be primary (row or primitive) pictorial information obtained from a camera subject are not utilized in the conventional technique.

To solve this disadvantage, the present inventors have proposed a method for conducting tonal conversion of pictures, using a specific tonal conversion formula where the values of the X axis which represent light exposure or light quantity and are determined from the density information values of the D axis through a density characteristic curve of a photosensitive emulsion instead of the density information values of the D axis (Japanese Patent Application No. 1-35825). The tonal conversion technique proposed by the present inventors, where pictorial information of a camera subject which should be a practical object of a reproduced picture is taken account of, is admitted to be superior to the conventional technique which depends on pictorial information of a medium picture. However, the technique previously proposed by the present inventors was not incorporated a rational technique for removing color-fog which occurs unavoidably on all originals more or less. The tonal conversion method of pictures in accordance with this invention is incorporated a technique for removing color-fog on the basis of the tonal conversion method previously proposed.

An object of the present invention is to provide a tonal conversion method of pictures, said tonal conversion method incorporated a technique for rationally and scientifically removing color-fog from original pictures having color-fog thereon. The density characteristic curves of respective R, G and B photosensitive emulsion layers of a color film is utilized together with pictorial information values on the X axis (row or primitive pictorial information values relating to the light quantity obtained from a camera subject) as picture information values instead of the density values on the D axis.

In summary, the present invention relates to a method for conducting a tonal conversion of a picture upon producing a reproduced picture, said reproduced picture being free of color-fog, from an original color picture of continuous tone having color-fog thereon, which comprises the steps of:

(a) preparing density characteristic curves of respective red (R), green (G) and blue (B) photosensitive emulsion layers of a photosensitive color film material used upon photographing the original color picture, each of said density characteristic curves being expressed in a coordinate system in which an axis of ordinates designated as D axis represents density values and an axis of abscissas designated as X axis represents pictorial information values on light exposure;

(b) designating a brightest area (H) and a darkest area (S) on the original color picture to measure the density values ($D_H$) of the brightest area (H) and the density values ($D_S$) of the darkest area (S) on the red (R), green (G) and blue (B) photosensitive emulsion layers respectively, by means of red (R), green (G) and blue (B) filters for cyan (C), magenta (M) and yellow (Y) color plates respectively and plotting the so-obtained density values ($D_H$) and ($D_S$) of the respective emulsion layers along the D axis;

(c) determining, from the density values ($D_n$) of the respective red (R), green (G) and blue (B) photosensitive emulsion layers in the range of from the brightest area ($D_H$) to the darkest area ($D_S$) on the D axis, picture information values ($X_n$) ranging from the brightest area ($X_H$) to the darkest area ($X_S$) on the X axis for producing the cyan (C), magenta (M) and yellow (Y) color plates in accordance with the corresponding density characteristic curves of the red (R), green (G) and blue (B) photosensitive emulsion layers;

(d) determining pictorial information values of desired number of control points out of the pictorial information values ($X_n$) of the respective color plates in the range of from the brightest area ($X_H$) to the darkest area ($X_S$) on the X axis for controlling the tonal conversion of the original picture and defining relative relations of the individual control points;

(e) determining, from the pictorial information values at the control points on the X axis, corresponding density values at a like number of control points on the D axis in the range of from the brightest area ($D_H$) to the darkest area ($D_S$) in accordance with the corresponding density characteristic curves, and defining relative relations of the individual on the D axis;

(f) comparing the relative relations of the control points for the respective color plates in the range of from the brightest area ($X_H$) to the darkest area ($X_S$) on the X axis with the relative relations of the corresponding control points in the range of from the brightest area ($D_H$) to the darkest area ($D_S$) on the D axis, and obtaining objective data on the color-fog;

(g) converting the pictorial information values ($X_n$) for the respective color plates obtained in step (c) into halftone intensities (y) such as dot area percents in accordance with the following formula:

$$y = y_H \cdot \frac{\alpha(1 - 10^{-kx})}{\alpha - \beta} \cdot (y_S - y_H)$$

where x: a basic density value ($X_n - X_H$) obtained by measuring a density value ($D_n$) of a desired picture element on a color original having color-fog thereon on the D axis by means of one of color filters, projecting the measured density value ($D_n$) on the X axis in accordance with the density characteristic curve of a photosensitive emulsion layer corresponding to the color filter, determining a pictorial information value ($X_n$) on the X axis, determining, in a same manner, a pictorial information value ($X_H$) on the X axis for producing a corresponding color plate, said pictorial information value ($X_H$) corresponding to a density value ($D_H$) on the D axis of the brightest area on the color original picture, and subtracting said pictorial information value ($X_H$) from said pictorial information value ($X_n$);

y: a halftone intensity such as dot area percentage of a picture element on a reproduced picture free of color-fog corresponding to a desired picture element on each color plate of the color original picture having color-fog thereon;

$y_H$: a halftone intensity such as a dot area percentage preset to either a density value ($D_H$) of the brightest area (H) or a corresponding pictorial information value ($X_H$) on the X axis upon measuring the color original picture by means of each color filter;

$y_S$: a halftone intensity such as a dot area percentage preset to either a density value ($D_S$) of the darkest area (S) on the D axis or a corresponding pictorial information value ($X_S$) on the X axis upon measuring the color original by means of each color filter;

α: a surface reflectance of a base material used for expressing the reproduced picture thereon;

β: a value determined by $\beta = 10^{-\gamma}$;

k: a value determined by $\gamma/(X_S - X_H)$, where $X_S$ represents the pictorial information value on the X axis corresponding to a density value ($D_S$) on the D axis of the darkest area (S) obtained by measuring the color original picture by means of each color filter; and γ: a desired optional factor determined on the basis of the objective data obtained in step (f).

BRIEF DESCRIPTION OF THE DRAWINGS

FIG. 4(C) is an illustration in which all of the four control points of the pictorial information for the respective color plates on the D axis are agreed; FIG. 5(C) is an illustration in which all of the four control points of the pictorial information for the respective color plates on the D axis are agreed.

DETAILED DESCRIPTION OF THE INVENTION

Figure 1:
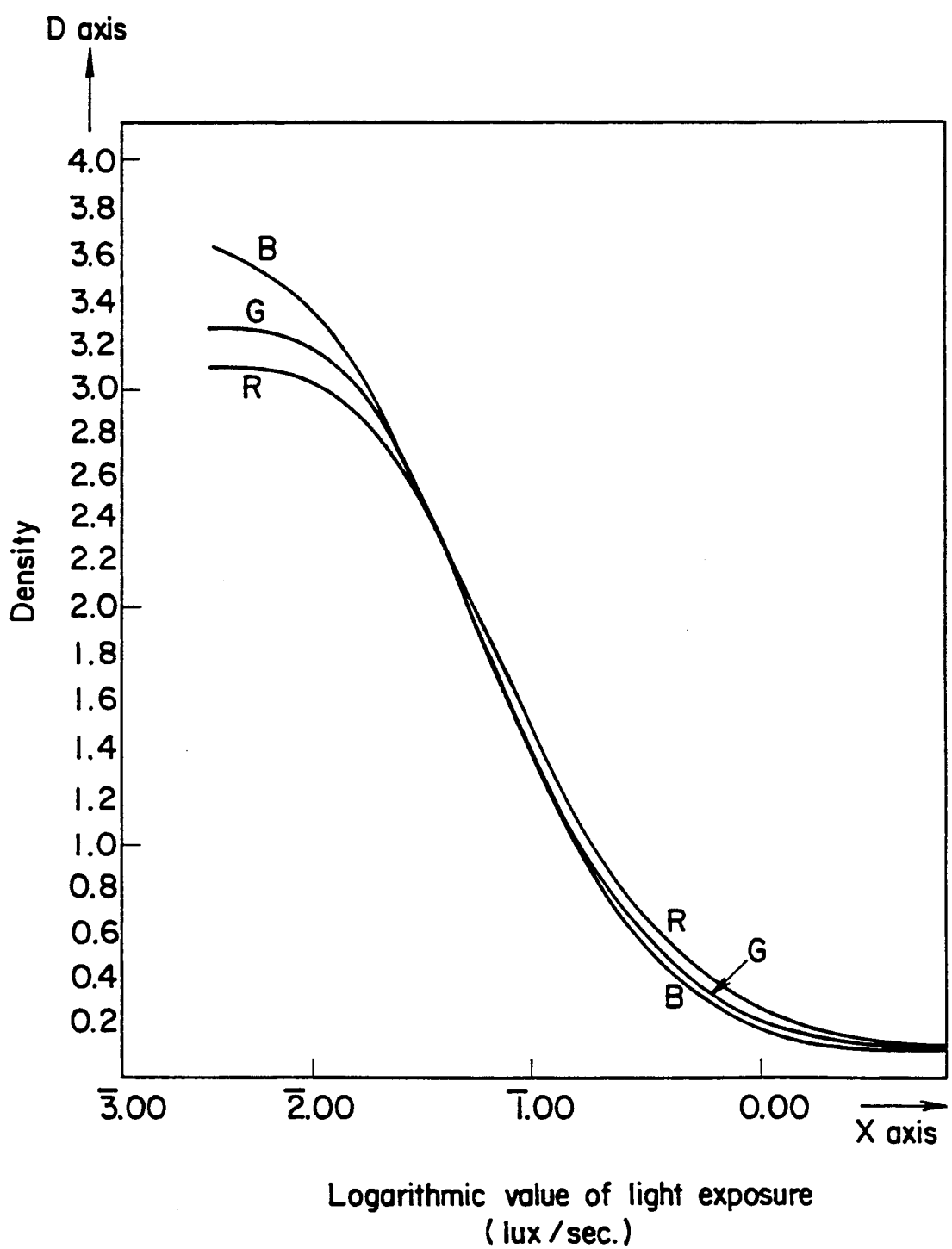
FIG. 1 is a diagrammatic illustration of density characteristic curves of photosensitive emulsion layers of R, G and B colors of a color film.

Features of the present invention will be hereinafter described in detail.

The present invention will be further described by way of a technique for producing a printed picture of halftone from an original color picture of continuous gradation, specifically more or less having color-fog thereon.

A major factor preventing the establishment of a systematic technique for removal of color-fog is attributed to the fact that the occurrence of color-fog is originated to various causes. It is a present state of the art that color fog is cured by treatments of the operator's work on a trial and error basis, even if the color separation work is conducted using highly-advanced color scanners, as previously described.

It is said that the major causes of occurrence of color-fog are as follows:

(1) A light quality (color temperature) of a light source for illumination is inappropriate upon photographing a picture.

(2) A developing process does not satisfy the standard condition.

(3) A light exposure upon photographing is inappropriate.

As previously mentioned, the tonal conversion of picture of this invention is conducted in such a manner that a pictorial information value (X axis) is determined from a density information value (D axis) through a density characteristic curve of a photosensitive emulsion of each color, thereby conducting tonal conversion on the basis of the so-obtained pictorial information by using said tonal conversion formula. The said tonal conversion formula was derived from the density formula (photographic density, optical density) accepted widely, namely, $$D = \log I_o/I = \log 1/T$$

where $I_o$: intensity of incident light,

I: intensity of light reflected or transmitted, and $1/T = I/I_o$ = reflectance or transmittance.

The above general formula for the density D may be applied to plate-making and printing in the following manner.

Density (D') in plate-making and printing =

$$\log I_o/I =$$

$$\log \frac{\alpha A}{\alpha\{A - (d_1 + \ldots + d_n) + \beta(d_1 + \ldots d_n)\}}$$

where

A: the unit area, $d_n$: the area of each dot in the unit area, d: the reflectance of the printing paper, and $\beta$: the surface reflectance of the printing ink.

On the basis of the above density formula (D'), a basic density value (x) of a desired sample point (picture element) on an original picture is determined by subtracting a density value of the brightest area on the original picture from a measured density value of the sample point (picture element), and a relation between the basic density value (x) thus-obtained and a value (y) of a dot area percent of said sample point (picture element) is harmonized with its corresponding data measured actually, thereby obtaining a tonal conversion formula:

$$y = y_H \cdot \frac{\alpha(1 - 10^{-kx})}{\alpha - \beta} \cdot (y_S - y_H)$$

where $$k = \frac{\text{(density range of a printed picture)}}{\text{(density range of an original picture)}},$$

$y_H$ = a dot area percent preset on the brightest area of the printed picture, and $y_S$ = a dot area percent preset on the darkest area of the printed picture.

The tonal conversion formula adopted in this invention is obtained by making improvements on the above tonal conversion formula. The parameters of the tonal conversion formula previously proposed are as described above.

Description will hereinafter be made on characteristics of color originals having color-fog thereon and a method for converting the tone of such color originals in accordance with this invention.

ACQUISITION OF OBJECTIVE COLOR-FOG DATA ON COLOR ORIGINALS

A color original having color-fog thereon is analyzed and the objective data of the color-fog is then obtained therefrom, using density characteristic curves (photographic characteristic curves) of a color film used upon photographing the color original.

(1) FIG. 1 is a diagrammatic illustration of density characteristic curves of photosensitive emulsion layers of R, G and B of EKTACHROME 64 (trade name; manufactured by Eastman Kodak) (exposure: day light, 1/50 sec., process: Process E-6, density measuring: Status A). FIG. 1 shows a D-X coordinate system, where the axis of ordinates (D axis) and the axis of abscissas (X axis) represent densities and logarithmic values of light exposure, respectively.

Figure 2:
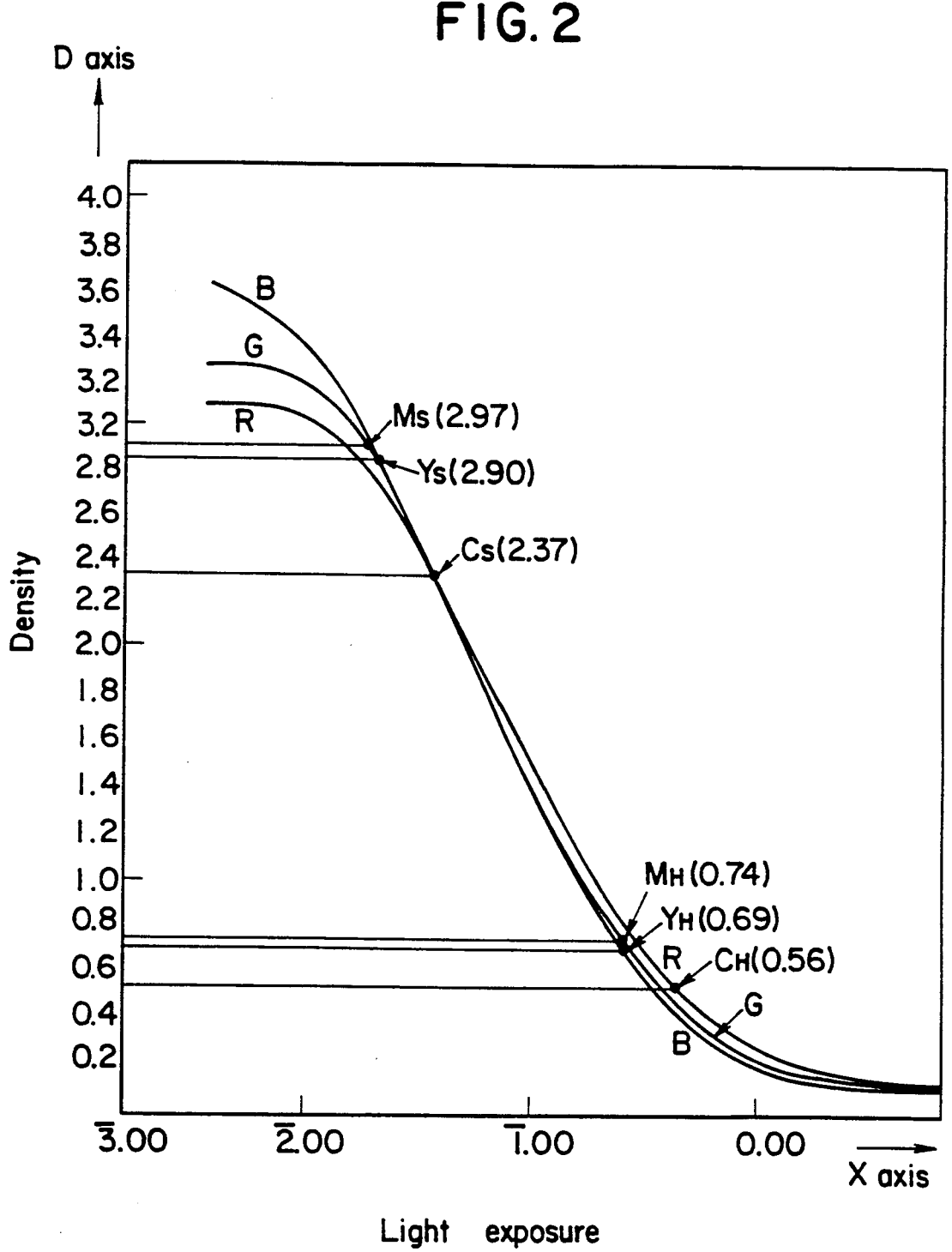
FIG. 2 is also a diagrammatic illustration of the density characteristic curves shown in FIG. 1, ranges of said density characteristic curves of R, G and B photosensitive emulsion layers being determined on the basis of density values in H and S areas of respective C, M and Y color plates.

(2) A brightest (H) and darkest (S) area are designated on the color original and density values $D_H$ and $D_S$ on the respective H and S areas are measured by means of color filters of R [for cyan plate (C)], G [for magenta plate (M)] and B [for yellow plate (Y)]. The so-measured values are then plotted on the respective density characteristic curves, whereby ranges of the density characteristic curves of the respective R, G and B are defined. This step is illustrated in FIG. 2. It is well known that pictorial information for C, M and Y plates are obtained from R, G and B filters, respectively. Incidentally, data of Example, which will be lately described, are depicted in FIG. 2.

(3) Next, the ranges of the density characteristic curves of R, G and B are projected on the X axis to determine their threshold values of the pictorial information. The pictorial information values on the X axis, which are basic information values adopted in the tonal conversion method of this invention, are determined through the intermediation of the density characteristic curves from the density values on the D axis, which are basic values adopted in the conventional technique. The pictorial information values on the X axis are undistorted values relating to physical quantities which are light quantities obtained from a camera subject (substantial picture, actual scene). On the other hand, the density information values on the D axis are essentially distorted by characteristics of sensitivities of the respective emulsion layers. In the tonal conversion method of pictures of this invention, the information values on the X axis which are free of distortion are used. This is a remarkable feature of this invention in contrast to the conventional technique.

For appropriately controlling the tonal conversion of pictures, control points are set on the basis of the threshold values ($X_H - X_S$) of the pictorial information values for producing C, M and Y color plates on the X axis each corresponding to the filter density values of R, G and B, respectively. For example, four points at $X_H$ (corresponding to $D_H$ of the H area on the D axis), $(X_S - X_H)/4 = m_2$ (on the side of $X_H$), $(X_S - X_H)/2 = m_1$ (intermediate point), and $X_S$ (corresponding to $D_S$ of the S area on the D axis) are set as the control points. It is needless to say that number of the control point are changeable as desired.

The relative relation among the four points set on the basis of the threshold values ($X_H - X_S$) of the pictorial information values on the X axis used for production of color plates are of course constant. Here, these control points are conversely projected on the D axis through the density characteristic curves of the respective emulsion layers (R, G and B). The density values ($D_H$, $D_{m2}$, $D_{m1}$ and $D_S$) corresponding to the respective control points, are determined to investigate their relative relations.

Figure 3:
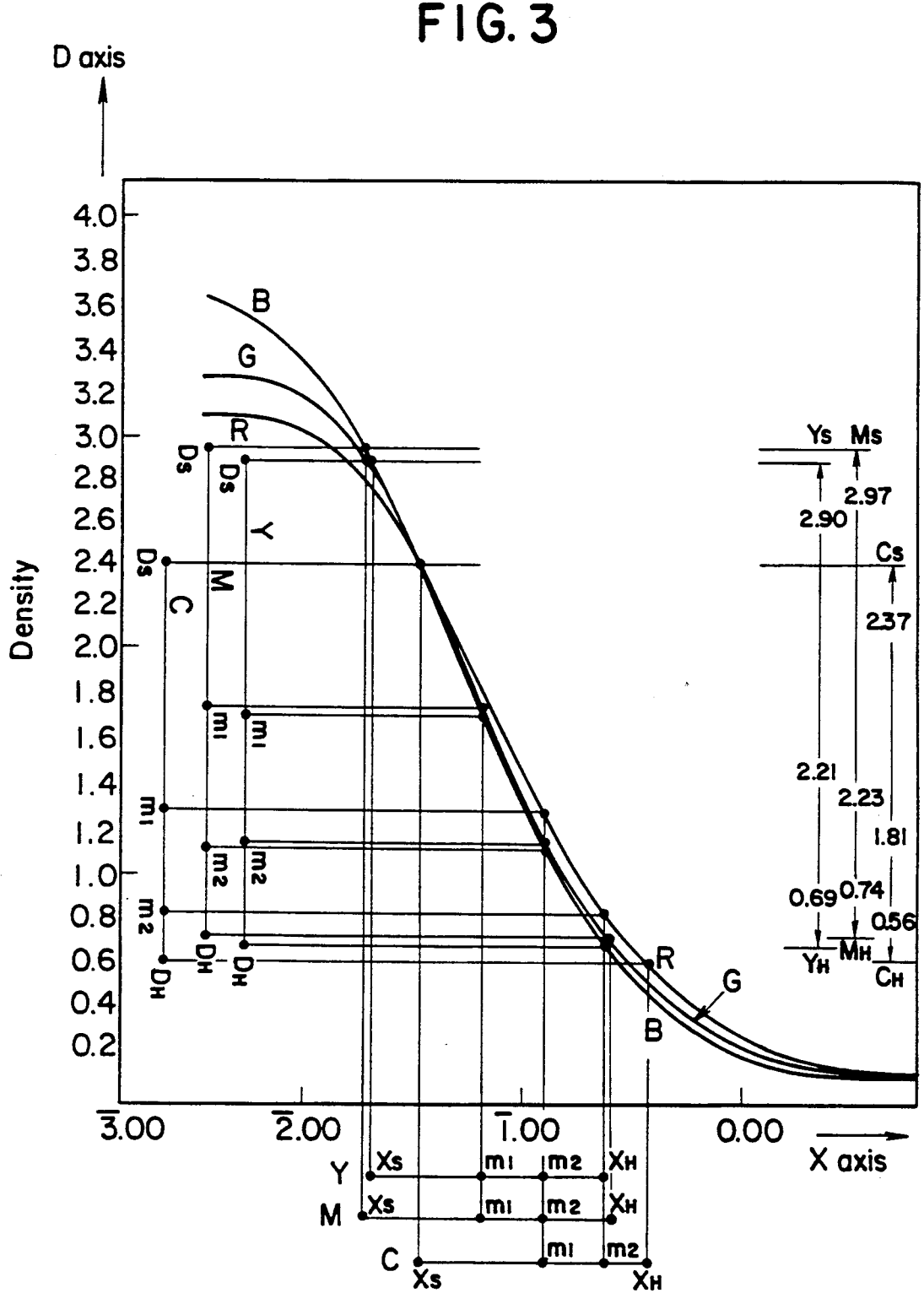
FIG. 3 is a diagrammatic illustration showing correlation among four control points on the X axis ($X_H$, $m_1$, $m_2$ and $X_S$) for the respective colors and corresponding four control points on the D axis ($D_H$, $m_1$, $m_2$ and $D_S$) in the ranges of the respective density characteristic curves shown in FIG. 2.

The detail illustration of the above description is shown in FIG. 3.

The present inventors have a view that the cause of occurrence of color-fog may be objectively grasped by analyzing FIG. 3. In other word, the cause and characteristics of color-fog may be correlated by analyzing the process of formation of the distorted density information values on the D axis such as the pictorial information values on the X axis used for production of color plates, which are undistorted values obtained from a camera subject as above described, are distorted by the density characteristic curves of R, G and B photosensitive emulsion layers, fixed on a color film photosensitive material as a color picture, then represented as the distorted density information values on the D axis.

(4) More specific description will be made on the details of occurrence of color-fog and a measure for removing the same.

It is known from the results of a number of experiments that no color-fog occurs on an original as long as a relative relation among the threshold values of the pictorial information values on the X axis free of distortion, i.e., the four control points, $X_H$, $m_1$, $m_2$ and $X_S$ in FIG. 3, used in production of color plates (C, M and Y) is maintained similar to a relative relation among the corresponding points ($D_H$, $m_1$, $m_2$ and $D_S$) on the D axis. On the contrary, it is known that color-fog occurs more or less except for the above case. The cause and detailed data of color-fog can be rationally and scientifically obtained by examining an arrangement of the control points on the D axis and shapes of the density characteristic curves of R, G and B emulsion layers of a color film.

Figure 4A:
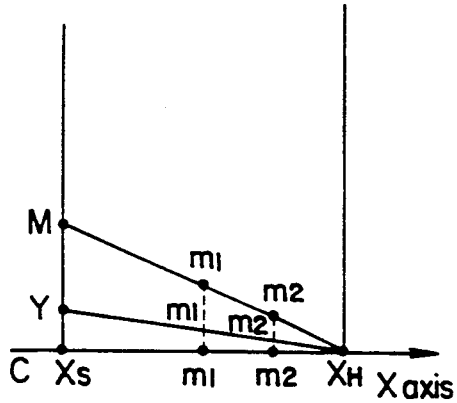
FIGS. 4(A), 4(B) and 4(C) are schematic illustrations for analyzing a cause of occurrence of color-fog, specifically red-color-fog belonging to original (1), FIG. 4(A) being a illustration in which $X_H$ and $X_S$ out of four control points of pictorial information for the respective color plates on the X axis are agreed, FIG. 4(B) being an illustration in which $D_H$ and $D_S$ out of the four control points are agreed on the D axis in a similar manner to FIG. 4(A)
Figure 4B:
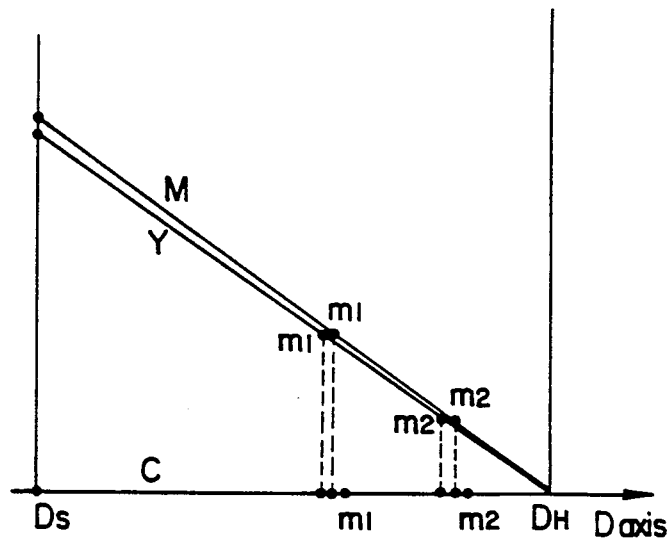
Figure 4C:
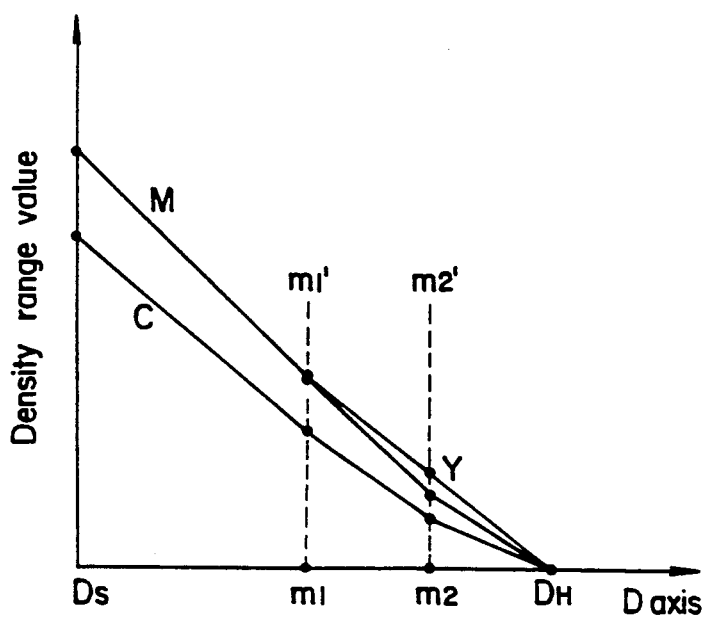

FIG. 4(A), 4(B) and 4(C) show results of an investigation for removing color-fog.

Referring to FIG. 4(A), pictorial information values on the X axis represent light quantities (light exposure) which have reached to a photosensitive color film material upon photographing the color original, said pictorial information values being free of distortion. The relative relation among the four control points set for controlling tonal conversion is maintained in the same condition. Namely, FIG. 4(A) is a diagrammatic illustration showing an arrangement of the control points of the respective color plates when their $X_H$ and $X_S$ are agreed with on the basis of the pictorial information values on the X axis for the C, M and Y color plates. It should be noted that $m_1$ S and $m_2$ S of the respective color plates are located in the same position on the X axis.

FIG. 4(B) is a diagrammatic illustration showing an arrangement of the control points of the respective color plates when the $D_H$ and $D_S$ are agreed on the basis of the density values of the D axis. The density values on the D axis correspond to the picture information values on the X axis for use in production of the C, M and Y color plates and are information values distorted by the density characteristic curves, which are used in conventional color separation process.

FIG. 4(C) is a diagrammatic illustration, which is extremely important for quantifying removal of color-fog.

In FIG. 4(B), the $m_1$ S and $m_2$ S of the respective C, M and Y color plates are located in different positions on the D axis in reference to the density values of the control points for use in production of the color plates in conventional color separation process. The density values are the distorted density information values on the D axis, control points ($D_H$, $m_1$, $m_2$ and $D_S$) of which correspond to the control points ($S_H$, $m_1$, $m_2$ and $X_S$) on the X axis, respectively. However, when evaluated by visual sensation of man, the picture quality of a color original is evaluated as if the entire image of the color original is totalized, namely there exist only one $m_1$ and only one $m_2$ thereon. The above description is illustrated in FIG. 4(C). In FIG. 4(C), numerical data in Example 1, which will be lately described, are used. The data are obtained from the results of analyse of a color original having thick red-color-fog thereon. Comparing FIG. 4(C) with FIG. 4(A) and 4(B), it would be recognized that the density values in the range of from $D_H$ and $D_S$ used for production of the Y plate are positioned higher than those of the M plate in FIG. 4(C). The present inventors have a view that this phenomenon (inversion phenomenon of the Y plate) becomes the basis for characterization and quantification of color-fog. The density values on the D axis relate to all the main causes of occurrence color-fog as previously mentioned in terms (1) to (3) of "Acquisition of objective color-fog data from a color original". When color separation (tonal conversion) is conducted on the basis of the pictorial information values on the X axis obtained from the density values on the D axis, it should be of course taken in account of this point. Namely, if the density information values on the X axis is simply obtained from the density values on the D axis and the density information values so-obtained is subjected to color separation, dot area percents for the Y plate become excessively large, thus red-color-fog cannot be removed rationally.

The present invention is for rational removal of color-fog making use of the specific tonal conversion formula derived from this invention, reflecting the result shown in FIGS. 4(A) to 4(C).

In the case of the above-described example, the dots on the Y plate should be decreased so as to remove the red-color-fog. It is obvious from the characteristic of the tonal conversion formula derived from this invention that the magnitude of the dot area percent can be voluntarily regulated by varying the $\gamma$ value in the tonal conversion formula. Consequently, by selecting an appropriate $\gamma$ value the dots on the Y plate may be suitably adjusted.

TONAL CONVERSION WORK

Following the analyzing work of color fog, color separation work will be hereinafter described. It is sufficient for color-separation of a color original having color-fog thereon that the pictorial information values $(X=X_n-X_{Hn})$ on the X axis free of distortion is converted into numeral values (y values) of dot area percent of a halftone picture by using the tonal conversion formula. Incidentally, a color separation curve of the X axis shows a correlation between the x and y values. Upon conversion, an appropriate $\gamma$ value in the formula for setting the color separation curves on the X axis for the respective C, M and Y plates is determined on the basis of the analyzed results of color-fog. As a matter of course, the mutual relations of dot area percent values in H, S and middle tone areas between C, and M and Y plates are determined so as to maintain well a gray-balance on the reproduced picture. The tonal conversion formula derived in this invention has the following features. One of the features is that the arrangement of numerical values of the dot area percent on a reproduced halftone picture, namely, the pictorial information values on the X axis, and the shape of a color-separation curve of the X axis showing relative relation of the pictorial information values on the X axis fall into the same as long as the parameters of four values $\alpha$, $\gamma$, $y_H$ and $y_S$ are unvaried. Another feature of the tonal conversion formula is that the shape of the color-separation curve on the X axis can be voluntarily changed by varying the $\gamma$ value out of said four parameters. By utilizing these features of the tonal conversion formula, color fog can be rationally removed, as shown in FIGS. 4(A) to 4(C).

This will be described referring FIGS. 4(A) to FIG. 4(B) in detail.

In FIG. 4(C), the density values for use in production of the Y plate are larger than the M plate due to color-fog. Therefore, it is sufficient for removal of color-fog that the difference between the Y and M plates is adjusted by varying the $\gamma$ value in the tonal conversion formula upon producing a reproduced halftone picture so as to obtain the dots of the same area percent on both of the Y and M plate, for example. In this case, the same result can be obtained if the Y plate is coincided to M plate or the M plate is coincided to the Y plate. One of advantageous features of the tonal conversion formula is that when a larger $\gamma$ value is adopted in the formula the resulting dot area percent will become larger and when a smaller $\gamma$ value is adopted the resulting dot area percent will become smaller. Accordingly, the tonal conversion formula can be flexibly conducted. Moreover, the values of dot area percent can be readily calculated from the tonal conversion formula. Consequently, color-fog can be rationally removed by appropriately conducting the tonal conversion formula on the basis of the data plotted in FIGS. 4(A) to 4(C).

In order to conduct the tonal conversion formula derived from this invention, undistorted pictorial information values on the X axis should be determined through the density characteristic curves from the density values on the D axis, as shown in FIG. 1.

Therefore, the density characteristic curve has to be appropriately formulated. Any suitable manner can be applied upon formulation of the density characteristic curve, being subjected to no restriction.

For example, assuming [the axis of ordinates] = D = $\log I_o/I$, [the axis of abscissas] = X = [logarithmic value of light exposure] (where the x axis has a scale graduated at an equal increment identical to the scale of the D axis), and a, b, c, d and f being constants, a density characteristic curve may be formulated as follows [refer to Table 1(A)]:

(i) leg portion of the density characteristic curve (downwardly curved portion, an area having small D values);

$$D = a \cdot b^{c \cdot (X+d) + e} + f$$

(ii) approximately linear portion of the density characteristic curve (nearly linear portion, an area having large D values);

$$D = a \cdot X + b,$$

or $$D = a \cdot X^2 + bX + c,$$

and (iii) shoulder portion of the density characteristic cruve (upwardly curved portion, an area having large D values);

$$D = a \cdot \log \{b + (X+c)\} + d.$$

It is possible that the entire density characteristic curve is divided into some small sections so that the density characteristic curve may be formulated in the form of $D=aX+b$. It is also possible that the leg portion of term (i) is further divided into some small sections so that the density characteristic curve may be formulated in the form of $D=aX+b$ [refer to Table 1(B)]. Results of the formulated density characteristic curves of a color film manufactured by Eastman Kodak plotted in FIG. 1 are shown in Tables 1(A) and 1(B).

TABLE 1 (A)

Table of equations for density characteristic curves
Equations for converting density values (D)
of a color original into values (X) of the x axis

| Emulsion layer | No. | D | X |
|---|---|---|---|
| R | 1 | 0.1444–0.8000 | $X = \log\{(D - 0.0756) + 0.05158\}$ |
|   | 2 | 0.8000–1.0000 | $X = 1.1475 + 0.7000(D - 0.8000)$ |
|   | 3 | 1.0000–1.2000 | $X = 1.2873 + 06.6000(D - 1.0000)$ |
|   | 4 | 1.2000–1.4000 | $X = 1.4075 + 0.3250(D - 1.2000)$ |
|   | 5 | 1.4000–2.2000 | $X = 1.5125 + 0.3000(D - 1.4000)$ |
|   | 6 | 2.2000–2.8000 | $X = 1.9125 + 0.5125(D - 2.2000)$ |
|   | 7 | 2.6000–2.8000 | $X = 2.1175 + 0.7125(D - 2.6000)$ |
|   | 8 | 2.8000–3.175 | $(D - 2.2638) \div 0.4455$ |
|   |   |   | $(1/100) \cdot 10$ |
|   |   |   | $X = 1.15 + e$ |
| G | 1 | 0.1444–0.8000 | $X = \log\{(D - 0.841) \div 0.04517\}$ |
|   | 2 | 0.8000–1.0000 | $X = 1.2000 + 0.7500(D - 0.8000)$ |
|   | 3 | 1.0000–1.4000 | $X = 1.3500 + 0.5825(D - 1.0000)$ |
|   | 4 | 1.4000–1.8000 | $X = 1.5750 + 0.50825(D - 1.4000)$ |
|   | 5 | 1.8000–2.6000 | $X = 1.7775 + 0.4250(D - 1.8000)$ |
|   | 6 | 2.6000–2.8000 | $X = 2.1175 + 0.4125(D - 2.6000)$ |
|   | 7 | 2.8000–3.0000 | $X = 2.2000 + 0.8375(D - 2.8000)$ |
|   | 8 | 3.000–3.2178 | $(D - 2.7035) + 0.3028$ |
|   |   |   | $(1/100) \cdot 10$ |
|   |   |   | $X = 1.2275 + e$ |
| B | 1 | 0.1333–0.8000 | $X = \log\{(D - 0.0758) \div 0.4314\}$ |
|   | 2 | 0.8000–1.0000 | $X = 1.2250 + 0.625(D - 0.8000)$ |
|   | 3 | 1.0000–1.4000 | $X = 1.3500 + 0.5625(D - 1.0000)$ |
|   | 4 | 1.4000–1.8000 | $X = 1.5750 + 0.30825(D - 1.4000)$ |
|   | 5 | 1.8000–2.6000 | $X = 1.7775 + 0.4250(D - 1.8000)$ |
|   | 6 | 2.6000–2.8000 | $X = 2.1175 + 0.4125(D - 2.6000)$ |
|   | 7 | 2.8000–3.0000 | $X = 2.2000 + 0.3250(D - 2.8000)$ |
|   | 8 | 3.0000–3.2000 | $X = 2.3050 + 0.5375(D - 3.0000)$ |
|   | 9 | 3.2000–3.4000 | $X = 2.4125 + 0.5765(D - 3.2000)$ |
|   | 10 | 3.4000–3.6000 | $X = 2.3278 + 1.7380(D - 3.4000)$ |

TABLE 1 (B)

Table of equations for an area
ranging from the highlight to the density value 0.8

| Emulsion layer | No. | D | X |
|---|---|---|---|
| R | 1 | 0.1444–0.2000 | $X = 0.1250 + 4.0468(D - 0.1444)$ |
|   | 2 | 0.2000–0.3000 | $X = 0.3500 + 2.3750(D - 0.2000)$ |
|   | 3 | 0.3000–0.4000 | $X = 0.5875 + 1.5000(D - 0.3000)$ |
|   | 4 | 0.4000–0.5000 | $X = 0.7375 + 1.3750(D - 0.4000)$ |
|   | 5 | 0.5000–0.6000 | $X = 0.8750 + 1.0000(D - 0.5000)$ |
|   | 6 | 0.6000–0.7000 | $X = 0.9750 + 0.9000(D - 0.6000)$ |
|   | 7 | 0.7000–0.8000 | $X = 1.0650 - 0.8250(D - 0.7000)$ |
| G | 1 | 0.1444–0.2000 | $X = 0.1250 + 5.8453(D - 0.1444)$ |
|   | 2 | 0.2000–0.3000 | $X = 0.4500 + 2.3750(D - 0.2000)$ |
|   | 3 | 0.3000–0.4000 | $X = 0.6875 + 1.5000(D - 0.3000)$ |
|   | 4 | 0.4000–0.5000 | $X = 0.8375 + 1.1000(D - 0.4000)$ |
|   | 5 | 0.5000–0.6000 | $X = 0.9475 + 0.9000(D - 0.5000)$ |
|   | 6 | 0.6000–0.7000 | $X = 1.0375 + 0.8250(D - 0.6000)$ |
|   | 7 | 0.7000–0.8000 | $X = 1.1300 + 0.8000(D - 0.7000)$ |
| B | 1 | 0.1333–0.2000 | $X = 0.1250 + 6.3718(D - 0.1333)$ |
|   | 2 | 0.2000–0.3000 | $X = 0.5500 + 2.0500(D - 0.2000)$ |
|   | 3 | 0.3000–0.4000 | $X = 0.7750 + 1.3259(D - 0.3000)$ |
|   | 4 | 0.4000–0.5000 | $X = 0.8875 + 1.0000(D - 0.4000)$ |
|   | 5 | 0.5000–0.6000 | $X = 0.9875 + 0.9500(D - 0.5000)$ |
|   | 6 | 0.6000–0.7000 | $X = 1.0825 + 0.7750(D - 0.6000)$ |
|   | 7 | 0.7000–0.8000 | $X = 1.1600 + 0.6500(D - 0.7000)$ |

Upon application of the tonal conversion formula in accordance with this invention, it is free to use the tonal conversion formula by modifying it as desired, to say nothing of its modification as follows:

$$y = y_H + E(a - 10^{-k \cdot x}) \cdot (y_S - y_H)$$

where $$E = \frac{1}{1 - \beta} = \frac{1}{1 - 10^{-r}}$$

In the above modification given by way of example, $a$ is assumed to be 1 ($a=1$). This means that the surface reflectance, for example, of a printing paper (base material) to be used to express or visualize the picture to be printed is set at 100%. As the value of $a$, any desired value may be chosen as will be appreciated from Table 1. From the practical viewpoint, it may be set at 1.0.

According to the above exemplary modification ($a=1.0$), $y_H$ and $y_S$ can be set respectively for the brightest area H and the darkest area S on the printed picture as intended, which constitutes a remarkable feature of this invention. This is evident from the fact that x becomes 0 ($x=0$) in the brightest area H in accordance with the definition and x becomes $X_S-X_H$ ($x=X_S-X_H$) in the darkest area S on the printed picture, namely, $$-k \cdot x = -\gamma \cdot \frac{X_S - X_H}{X_S - X_H} = -\gamma.$$

Upon application of the above tonal conversion formula derived in this invention, it is extremely important for users when predicting the results of their work that the values of $y_H$ and $y_S$ can be set on a printed picture as intended at any time. For example, when $y_H$ and $y_S$ in a printed picture are set at desired values and the value $\gamma$ (assume $a=1$) is varied, various types of color separation curves on the x axis can be obtained. A printed picture formed on the basis of the so-obtained color separation curves on the x axis may be readily evaluated in relation with the $\gamma$ value.

The tonal conversion technique of pictures using the tonal conversion formula derived in this invention is extremely useful for reproduction of the gradation and tone of an original picture, namely, for reproducing the tone of a camera subject at the ratio of 1:1 on a printed picture with work rulability. It should be noted that its usefulness is not limited only to such an application. In addition to reproducibility faithful to the characteristic of a camera subject, the tonal conversion formula derived in the present invention is also extremely useful for rational modification or correction of the picture characteristic by suitably selecting the values $a$, $\beta$, $\gamma$, $y_H$ and $y_S$.

Having been described the applications of the tonal conversion technique of pictures of this invention specifically in relation with production of printed pictures, it should be noted that its applications are not limited only to production of printed pictures. Namely, the tonal conversion technique can be applied effectively to the following case:

(i) When it is desired to show a gradation or tone by changing the size of each dot as seen in printed pictures as described above in detail, such as letterpress, lithography, halftone gravure and silk screen pictures (this method is called "variable-area gradation method").

The tonal conversion method of this invention can also be applied effectively to the following cases.

(ii) When it is desired to show a gradation or tone by changing the intensity of a pigment or dye (coloring material), like a printing ink, to be caused to adhere per picture element (for example, per dot), which has a uniform area, as seen in fusion-transfer type thermal transfer pictures, (silver-salt utilized) thermally-developed transfer pictures and conventional gravure pictures (this method is called "variable-density gradation method").

(iii) When it is desired to show a gradation by changing the recording density per unit area, for example, the number of dots, the number and/or size of ink droplets, or the like as seen in pictures produced by a digital copying machine (color copies, etc.), printer (ink-jet type, bubble-jet type, or the like) or facsimile [this method is similar to the variable-area gradation method (i)].

(iv) When it is desired to obtain a CRT picture from video signals, TV signals or high-definition TV signals by adjusting the level of luminance of each unit picture element, or to obtain a halftone print or hard copy from the CRT picture.

(v) In addition to the tonal conversion of an original picture into a reproduced picture in substantially the same density (luminance and illuminance) range, when photographing is conducted in a range invisible from the standpoint of space, luminance, wavelength or time, for example, when pictorial information is inputted and converted in a low illuminance range where there is a large difference in density range between an original picture and a reproduced picture because of an extremely low contrast of the original picture (photographing by a high-sensitivity camera, or the like) - (in such a case, an emphasis is placed on the exaggeration conversion of the contrast of the picture rather than the tonal conversion of the picture).

(vi) When a diagnostic X-ray picture of poor quality is subjected to tonal conversion to achieve a correct diagnosis or to avoid any false diagnosis (this is not limited to X-ray pictures but applies to all diagnostic pictures in general).

(vii) Besides, the tonal conversion method of this invention can be applied to densitometers equipped with a density and tone conversion system to display a tone area percent and the like along with a density, printing-related equipment such as simulators for advance testing of color separation (for example, color proofing simulators) and simulators for the education of color separation, etc.

Upon application of the tonal conversion method of this invention, which uses the tonal conversion formula, in the various application fields described above, it is only necessary to determine pictorial information values of a camera subject (substantial picture) corresponding to pictorial information values and/or electrical pictorial information signals, which may be either analog or digital signals, relating to the density obtained from an original picture (including a hard original and a soft original) on the basis of density characteristic curves of information values relating to density information of the original and pictorial information values of the camera subject, subject the pictorial information value thus-determined to tonal conversion by means of the tonal conversion formula derived from this invention at a picture processing unit (tonal conversion unit) of an equipment in each of the various application fields, then control the current or voltage level in the recording portion (recording head) of the equipment or the impressing time or the like in accordance with thus processed value, i.e., $\gamma$ value (tonal intensity) to change the number of dots per unit area (per picture element), the density per given area (for example, 1 dot) or the like, thereby making it possible to output a reproduced halftone or like picture having a density gradation corresponding to the camera subject (substantial picture) at the ratio of 1:1.

For example, to make original plates for a printed picture which is a halftone picture, namely, original printing plates by using the tonal conversion method of this invention which is based on the tonal conversion formula, it is only necessary to use a conventional system well known in the present field of art. The above plate-making work can be achieved by incorporating a software, which can perform the tonal conversion method of this invention, in a commercial color-separation and halftone scanning system such as an electronic color separation apparatus (color scanner or total scanner) to practise.

Described more specifically, as the conventional system, may be mentioned a system for making an original printing plate by exposing an original picture (medium picture), which is a continuous-tone picture such as a color photograph, to a spot light of a small diameter, receiving at a photoelectric conversion unit (photomultiplier) light (a pictorial information signal) reflected by or transmitted through the original picture, processing the thus-obtained electrical signal (electrical value) of pictorial information by a computer as needed, controlling an exposing light source based on a processed electrical signal (voltage) of pictorial information outputted from the computer, and then exposing a blank film to a laser spot light. It is thus only necessary to incorporate a software capable of adjusting the information values relating to the density of the original (medium picture) to the pictorial information values of the corresponding camera subject (substantial picture) along with converting electrical signals of continuous-tone pictorial information into electrical signals of a pictorial information by using the tonal conversion formula of this invention, for example, in a computerized processing unit of the above system, said unit being adapted to process electrical signals of pictorial information of the original picture (medium picture). Such a software may take any one of various forms such as a general purpose computer storing an algorithm of the tonal conversion formula derived in this invention as a software and having an I/F (interface) for AD (analog-digital conversion) and D/A, an electric circuit embodying the algorithm as a logic by a general purpose IC, an electric circuit with a ROM containing results computed in accordance with the algorithm, a PAL, gate array or custom IC with the algorithm embodied as an internal logic, etc. Reflecting the recent development of modularisation in particular, a computing system capable of performing tonal conversion of a picture in its density range on the basis of the tonal conversion formula derived in this invention can be easily fabricated as a module of a special-purpose IC, LSI, microporcessor, microcomputer or the like. An original printing plate of a halftone gradation having the dot area percent (value y) derived by the tonal conversion formula can be easily made by causing a photoelectrically-scanning spot light to advance successively as discrete spots and operating a laser exposing unit in unison with the scanning.

ADVANTAGES OF THE INVENTION

The present invention permits tonal conversion of pictures along with rational removal of color-fog belonging to color originals.

Namely, this invention provides a tonal conversion method of pictures useful upon producing various types of reproduced pictures such as printed pictures free of color-fog from original pictures (various types of medium pictures stored on or in recording media such as photosensitive emulsions, photoelectric materials, and photoconductive materials) having more or less color-fog thereon.

The conventional techniques for removing color-fog are as follows:

(1) Color-fog is intended to be removed totally based on experiences and perception of the operator.

(2) Color-fog is intended to be removed in plate-making and printing process by using density values (density values of the D axis) of a density characteristic curve of a photosensitive film material used upon photographing an original picture, which density values are obtained from a single representative curve (a density characteristic curve of the R emulsion layer for producing the C plate, practically), not from each of the density characteristic curves of the respective color plates. This is a previous proposal by the present inventors.

(3) Color-fog is intended to be removed on the basis of light exposure values (pictorial information values of the X axis, as previously described) obtained from a density characteristic curve of a photosensitive film material. However, the pictorial information values of the X axis obtained from the density characteristic curve of the R emulsion layer are also used in this case. This is an improved technique of the foregoing item (2), being also another proposal by the present inventors.

Item (1) is completely irrational and Items (2) and (3) are insufficient although considerably improved.

The tonal conversion of pictures in accordance with this invention is indispensable upon producing reproduced pictures. The tonal conversion is performed in a manner that objective data relating to color-fog are obtained from a color original fatally having color-fog thereon along with undistorted pictorial information values on the X axis for the respective C, M and Y color plates obtained from the density characteristic curves of the R, G and B emulsion layers and tonal-conversion is conducted using a specific tonal conversion formula, whereby color-fog is rationally removed from the reproduced picture.

EMBODIMENT OF THE INVENTION

EXAMPLE

This invention will hereinafter be described in more detail by way of an example for rationally removing color-fog occurred on a color original. It should however be borne in mind that the present invention is not limited to or by the following example so long as the essential features thereof are not departed.

Systems and equipments used in this example are as follows:

(1) Ektachrome 64 (tradename), Professional film (day light) manufactured by Eastman Kodak, in size 4"×5" was used upon photographing color originals.

(2) Magnascan 646-M (tradename) (color scanner) manufactured by Crosfield Electronics was used for color-separation of the originals.

(3) Chromarine proof press manufactured by Du Pont was used for color-proofing.

(4) Macbeth R-927 (tradename) (densitometer) manufactured by Macbeth was used for measuring the density of the color originals.

1. Color-fogged originals:

As originals having color-fog thereon, two pictures were chosen, one being a picture of a round fan [hereinafter called "original (1)"] which has red-color-fog on its entire surface and another one being a picture of fruits [hereinafter called "original (2)"] which has yellow-color-fog on its entire surface as similar to the original (1). The color-fog belonging to these original pictures brings great difficulties into the process, if tried to be treated with a conventional color-separation technique.

2. Preparation of color-separation work:

(i) In order to rationally set color separation curves., i.e., color separation curves on the X axis obtained by conducting the tonal conversion formula of this invention, there were used density characteristic curves of photosensitive materials of the color film relating to said film manufactured by Eastman Kodak, which density characteristic curves are plotted in a D-X rectangular coordinate system as shown in FIG. 1. FIG. 1 shows the density characteristic curves of the emulsion layers of R, G and B.

Relations for converting values on the D axis into values on X axis (functional relations) are listed in Table 1. Logarithmic values of light exposure (i.e., values read on the X axis having a scale graduated at a regular increment identical to that of the D axis) were selected as pictorial information values of the X axis upon functional formulation.

(ii) Four points were selected out of the pictorial information values on the X axis for use in producing color plates (C, M and Y) as control points to appropriately control the tonal conversion of the original color picture into a reproduced printed picture.

The four points are $X_H$ (corresponding to $D_H$), $X_S$ (corresponding to $D_S$), $m_1$ (an intermediate point between $X_H$ and $X_S$) and $m_2$ (a point at $(X_S-X_H)/4$ on the $X_H$ side).

The four control points ($X_H$, $X_S$, $m_1$ and $m_2$) on the X axis for each color plate correspond to four point, i.e. $D_H$, $D_S$, $m_1$ and $m_2$, on the D axis through the density characteristic curves.

(iii) A value of $\alpha$ was set at 1.0 ($\alpha=1.0$) in the tonal conversion formula of this invention taking consideration of the present state of plate-making and printing work. Also the $\gamma$ value in the formula was set at 0.45 for the C plate. Incidentally, the $\gamma$ value was so determined that halftone dots become 50% in the intermediate tone area (density point at $(S-H)/4$ on the H area side) on the C plate. This reflects the practice of plate-making and printing work.

(iv) Correlations of dot area percent values in H, S and intermediate tone areas on the C, M and Y color plates for regulating the gray balance on a reproduced printed picture are determined according to a common practice in the field of art, as tabulated in Table 2.

TABLE 2

| Table of standard dot area percent values of color plates for setting color separation curves | | | |
|---|---|---|---|
| Color plate | H | Intermediate tone | S |
| C (cyan) | 5.0 | 50.0 | 95.0 |

TABLE 2-continued

Table of standard dot area percent values
of color plates for setting color separation curves

| Color plate | H | Intermediate tone | S |
|---|---|---|---|
| M (magenta) | 3.0 | 40.0 | 90.0 |
| Y (yellow) | 3.0 | 40.0 | 90.0 |

Note: Figures in this Table are values of dot area %.

3. Analysis of color-fog:

(i) Density values in the H and S areas on the two color original pictures were measured by a densitometer through filters for the respective color plates. Obtained results are tabulated in Table 3.

TABLE 3

Table of color picture density values

| Color original | Densitometer filter | Color plate | H | X | Density range |
|---|---|---|---|---|---|
| (1) Round fan | R | C | 0.56 | 2.37 | 1.87 |
|  | G | M | 0.74 | 2.97 | 2.23 |
|  | B | Y | 0.69 | 2.90 | 2.21 |
| (2) Fruits | R | C | 0.26 | 1.90 | 1.64 |
|  | G | M | 0.38 | 2.66 | 2.28 |
|  | B | Y | 0.56 | 2.45 | 1.89 |

(ii) The density values listed above are plotted on the density characteristic curves of R, G and B in FIG. 1. The pictorial information values of the respective color plates (C, M and Y) of the color original ranging from the H to S areas are then defined on the density characteristic curves.

The so-defined pictorial information values are projected on the X axis to define threshold values of the pictorial information values for the respective color plates (C, M and Y). Four control points (previously mentioned $X_H$, $m_1$, $m_2$ and $X_S$) are plotted at the threshold values.

The four control points ($X_H$, $m_1$, $m_2$ and $X_S$) on the X axis are projected through the density characteristic curve to define the corresponding control points (previously mentioned $D_H$, $m_1$, $m_2$ and $D_S$) on the D axis.

(iii) Comparing a positional relation of the four control points on the D axis with a positional relation of the four control points on the X axis, difference between the two relations are examined, thereby obtaining data of color-fog for removing the same. Results obtained in these process relating to color original (1) having thick red-color-fog thereon and color original (2) having thick yellow-color-fog thereon are shown in FIGS. 4(A), 4(B) and 4(C), and FIGS. 5(A), 5(B) and 5(C), respectively.

(iii-a) On the basis of FIGS. 4(A), 4(B) and 4(C), details of the color fog belonging to original (1) will be analyzed. It would be readily understood by many observers that the original picture has red-color-fog on its entire surface. Nevertheless, it is known from FIG. 4(C) that the density values (density information values for use in production of the Y plate) for the Y plate are positioned higher than the density values for the M plate in the intermediate tone area. If no measure is taken to compensate the difference of the densities at the density information values for producing the Y and M plates, a resulting color printed picture would be excessively yellow-colored in its intermediate tone. As a countermeasure, the γ value for the Y plate in the formula has to be set at 0.100 instead of 0.135 which is equal to the γ value for the M plate, upon conducting tonal-conversion of the picture in order to decrease the dots of the Y plate in the intermediate tone area.

Obtained values of that area percent for the Y plate from the formula where the γ value is set at both 0.100 and 0.135 are shown side by side in Table 4, for comparison.

Figure 5A:
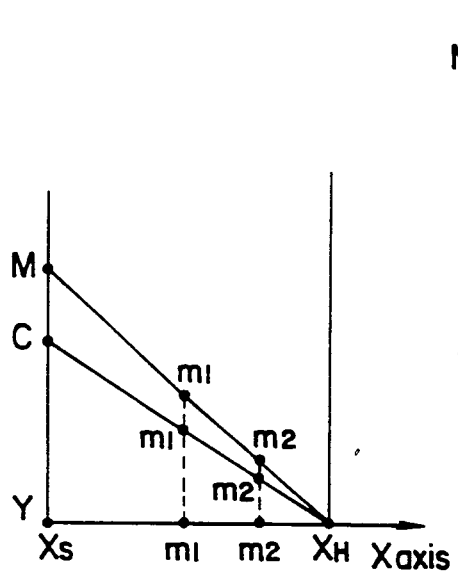
FIGS. 5(A), 5(B) and 5(C) are schematic illustrations similar to FIGS. 4(A), 4(B) and 4(C) for analyzing a cause of color-fog, specifically yellow-color-fog belonging to original (2), FIG. 5(A) being a illustration in which $X_H$ and $X_S$ out of four control points of pictorial information for the respective color plates on the X axis are agreed, FIG. 5(B) being an illustration in which $D_H$ and $D_S$ out of the four control points are agreed on the D axis in a similar manner to FIG. 5(A)
Figure 5B:
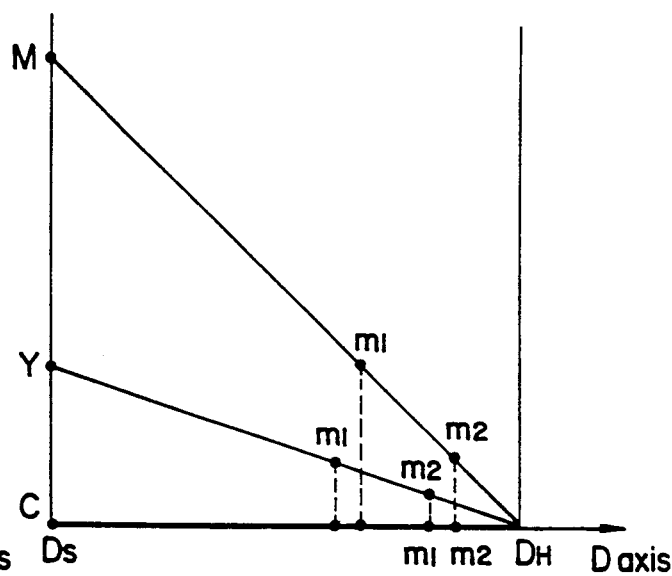
Figure 5C:
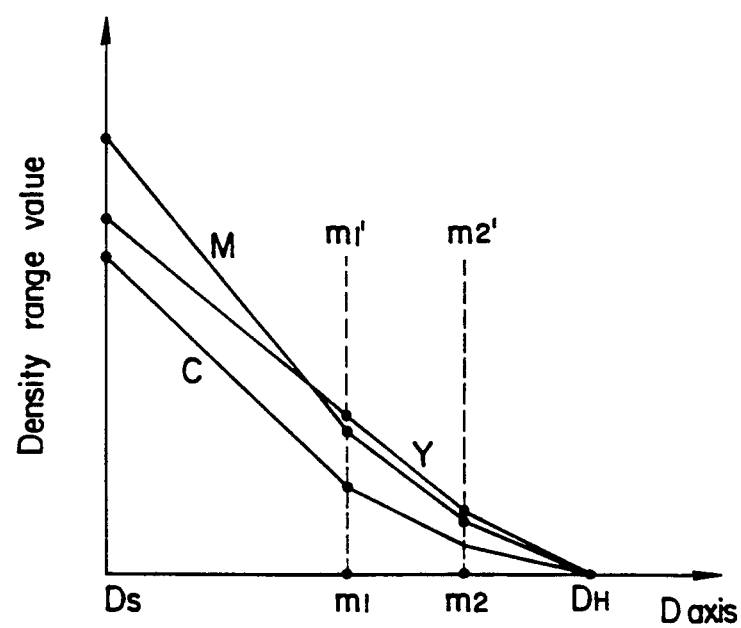

(iii-b) In a similar manner, the details of color fog belonging to original (2) will be analyzed referring to FIGS. 5(A), 5(B) and 5(C). The relation among the color plates shown in FIG. 5(C) indicates the following fact.

There exists a commonly accepted idea among scanner operators that it is difficult to handle such color originals having thick yellow-color-fog thereon in color-separation work. However, it is certain that a reproduced picture with excellent tone (gradation and tone) and good gray-balance will be available without taking any special countermeasure for removing the color fog, if the color separation is carried out by adopting the pictorial information values on the X axis based on the respective density characteristic curves of the emulsion layers of R, G and B and conducting the tonal conversion formula in accordance with this invention. It is emprically known that excellent results relating to reproducibility of tone and removal of color-fog are available in tonal conversion of pictures by conducting the tonal conversion formula according to this invention in a manner that a color separation curve on the X axis for the C plate is first set using the pictorial information values on the x axis through a single density characteristic curve (three density characteristic curves of the respective emulsion layers of R, G and B are employed in this invention), then another color separation curves for M and Y plates are set to make plates in the case that the density ranges on the D axis of the color plates differ more or less from each other. Comparing FIG. 4(C) with FIG. 5(C), in FIG. 4(C) the density information values used for producing the M plate are smaller than the density values for producing the Y plate in the area ranging from the H area to the intermediate tone area, besides the both values mingle with each other. On the contrary, in FIG. 5(C) the both values maintain a parallel relation and the density information values used for producing the M and Y plates differ largely from each other. The present inventors have a view that the density information values of the respective color plates in the range of from H to $m_1$, particularly the values plotted in FIG. 4(C), would largely concern to occurrence of color-fog. Consequently, no special measure for removing color-fog was taken upon setting the color separation curves for original (2). From the standpoint of this view, color-fog was tried to be removed, as mentioned later.

4. Setting of color separation curves on the X axis and color separation:

Data for setting color separation curves are tabulated, taking in consideration of the view of removing color-fog in the foregoing descriptions (iii-a) and (iii-b).

Tables 4 and 5 each shows the data for setting color separation curves of color originals of photographs of a round fan and fruits, respectively.

TABLE 4

Original (1) - Round Fan -
Table of data for setting color separation curves

| Emulsion layer γ-value | Step No. | Density value of D axis | Light exposure value of X axis | Dot area % of X axis | Dot area % of D axis | Dot area % when γ value of B (Y plate) is set at 0.135 |
|---|---|---|---|---|---|---|
| R (C-plate) γ = 0.450 | 1 | 0.5600 | 0.9350 | 5.0000 | 5.0000 | |
| | 2 | 0.7245 | 1.0852 | 23.9708 | 17.5412 | |
| | 3 | 0.8891 | 1.2099 | 37.7440 | 28.9501 | |
| | 4 | 1.0536 | 1.3197 | 48.5657 | 39.3380 | |
| | 5 | 1.2182 | 1.4171 | 57.2407 | 48.7881 | |
| | 6 | 1.3827 | 1.5034 | 64.2714 | 57.3924 | |
| | 7 | 1.5473 | 1.5862 | 70.4813 | 65.2265 | |
| | 8 | 1.7118 | 1.6684 | 76.1710 | 72.3440 | |
| | 9 | 1.8764 | 1.7507 | 81.4310 | 78.8360 | |
| | 10 | 2.0409 | 1.8330 | 86.2861 | 84.7364 | |
| | 11 | 2.2055 | 1.9153 | 90.7652 | 90.1088 | |
| | 12 | 2.3700 | 1.9996 | 95.0000 | 95.0000 | |
| G (Y-plate) γ = 0.135 | 1 | 0.7400 | 1.1520 | 3.0000 | 3.0000 | |
| | 2 | 0.9427 | 1.3070 | 16.2877 | 12.0734 | |
| | 3 | 1.1755 | 1.4318 | 26.5910 | 20.8901 | |
| | 4 | 1.3482 | 1.5459 | 35.7143 | 29.4649 | |
| | 5 | 1.5509 | 1.6514 | 43.9044 | 37.7972 | |
| | 6 | 1.7536 | 1.7540 | 51.6485 | 45.9009 | |
| | 7 | 1.9564 | 1.8434 | 60.2223 | 53.7822 | |
| | 8 | 2.1591 | 1.9301 | 64.4528 | 61.4371 | |
| | 9 | 2.3619 | 2.0163 | 70.5013 | 68.8820 | |
| | 10 | 2.5645 | 2.1024 | 76.4081 | 76.1164 | |
| | 11 | 2.7673 | 2.1865 | 82.0449 | 83.1522 | |
| | 12 | 2.9700 | 2.3084 | 90.0000 | 90.0000 | |
| B (M-plate) γ = 0.100 | 1 | 0.6900 | 1.1523 | 3.0000 | 3.0000 | 3.0000 |
| | 2 | 0.8909 | 1.2818 | 14.3104 | 11.7623 | 14.6993 |
| | 3 | 1.0918 | 1.4016 | 24.5020 | 20.3395 | 25.1455 |
| | 4 | 1.2927 | 1.5146 | 34.0662 | 28.7426 | 34.8645 |
| | 5 | 1.4936 | 1.6224 | 42.6300 | 36.9681 | 43.4970 |
| | 6 | 1.6945 | 1.7241 | 50.7027 | 45.0268 | 51.5728 |
| | 7 | 1.8955 | 1.8183 | 58.0298 | 52.9218 | 58.8502 |
| | 8 | 2.0964 | 1.9035 | 64.5320 | 60.6466 | 65.2661 |
| | 9 | 2.2973 | 1.9889 | 70.9325 | 69.2147 | 71.5422 |
| | 10 | 2.4982 | 2.0742 | 77.2131 | 75.6228 | 77.6624 |
| | 11 | 2.6991 | 2.1584 | 83.3069 | 82.8806 | 83.5639 |
| | 12 | 2.9000 | 2.2525 | 90.0000 | 90.0000 | 90.0000 |

TABLE 5

Original (2) - Fruits -
Table of data for setting color separation curves

| Emulsion layer | Step No. | Density value of D axis | Light exposure value of X axis | Dot area % of X axis | Dot area % of D axis |
|---|---|---|---|---|---|
| R (C-plate) γ = 0.450 | 1 | 0.2600 | 0.4925 | 5.0000 | 5.0000 |
| | 2 | 0.4091 | 0.7500 | 31.4324 | 17.5412 |
| | 3 | 0.5582 | 0.9332 | 47.1277 | 28.9501 |
| | 4 | 0.7073 | 1.0709 | 57.4754 | 39.3380 |
| | 5 | 0.8564 | 1.1870 | 65.3381 | 48.7881 |
| | 6 | 1.0055 | 1.2908 | 71.7676 | 57.3924 |
| | 7 | 1.1545 | 1.3802 | 76.8808 | 65.2265 |
| | 8 | 1.3036 | 1.4619 | 81.2426 | 72.3440 |
| | 9 | 1.4527 | 1.5389 | 85.0919 | 78.8360 |
| | 10 | 1.6018 | 1.6134 | 88.5960 | 84.7364 |
| | 11 | 1.7509 | 1.6880 | 91.8955 | 90.1088 |
| | 12 | 1.9000 | 1.7625 | 95.0000 | 95.0000 |
| G (M-plate) γ = 0.135 | 1 | 0.3800 | 0.7075 | 3.0000 | 3.0000 |
| | 2 | 0.5873 | 0.9625 | 20.4996 | 12.0734 |
| | 3 | 0.7945 | 1.1430 | 32.3152 | 20.8901 |
| | 4 | 1.0018 | 1.3510 | 45.3696 | 29.4649 |
| | 5 | 1.2091 | 1.4684 | 52.4840 | 37.7972 |
| | 6 | 1.4164 | 1.5833 | 59.2725 | 45.9009 |
| | 7 | 1.6236 | 1.6882 | 65.3250 | 53.7822 |
| | 8 | 1.8309 | 1.7906 | 71.1007 | 61.4371 |
| | 9 | 2.0382 | 1.8787 | 75.9688 | 68.8820 |
| | 10 | 2.2455 | 1.9668 | 80.7448 | 76.1164 |
| | 11 | 2.4527 | 2.0549 | 85.4305 | 83.1522 |
| | 12 | 2.6600 | 2.1423 | 90.0000 | 90.0000 |
| B (Y-plate) γ = 0.135 | 1 | 0.5600 | 0.9350 | 3.0000 | 3.0000 |
| | 2 | 0.7318 | 1.0912 | 16.8270 | 12.0734 |
| | 3 | 0.9036 | 1.2898 | 33.5651 | 20.8901 |
| | 4 | 1.0755 | 1.3925 | 41.8652 | 29.4649 |
| | 5 | 1.2473 | 1.4591 | 49.4567 | 37.7972 |
| | 6 | 1.4191 | 1.5847 | 56.7762 | 45.9009 |
| | 7 | 1.5909 | 1.6716 | 63.2579 | 53.7822 |
| | 8 | 1.7627 | 1.7586 | 69.5947 | 61.4371 |
| | 9 | 1.9345 | 1.8347 | 75.0152 | 68.8820 |
| | 10 | 2.1064 | 1.9077 | 80.1060 | 76.1164 |
| | 11 | 2.2782 | 1.9807 | 85.0946 | 83.1522 |
| | 12 | 2.4500 | 2.0538 | 90.0000 | 90.0000 |

On the basis of the data shown in Tables 4 and 5, color separation curves for a color scanner were set to perform color separation for producing color proofing printed pictures. Resulting reproduced pictures for proofing were free of color fog and the pictures each has an excellent picture quality in addition to a natural density gradient, as expected.

The following points were improved as comparing these reproduced pictures with reproduced pictures produced in the conventional technique.

(1) The color proofing printed pictures produced in accordance with this invention have density gradients on the entire picture images, which gives natural feeling to visual sensation of man more than the color proofing printed pictures produced in accordance with the conventional technique. In particular, the density and gradation in the intermediate tone area of the pictures were well expressed or visualized so that so-called voluminous tone, there being a strong demand to pictures in voluminous tone among many orderers, was obtained.

(2) The color-fog was removed from all of the pictures, thereby enabling to provide natural feeling to the visual sensation of man. The difference of effect in respect to removal of color-fog between the above two method, i.e., this invention and the conventional technique, was not admitted on the color proofing printed pictures of original (1) except for the difference in respect to the voluminous tone, as mentioned in term (1). Relating to original (2), a large difference was admitted between them.

The reproduced picture produced in the conventional technique has a tone tinged with yellow-color on its entire surface since the tone of yellow-color-fog belonging to the color original is brought into its reproduced color proofing picture. The reproduced color proofing picture produced in accordance with this invention had a tone relieved from yellow-color-fog belonging to the color original. Moreover, it provided a tone close to the actual camera subject of the color picture when visually observed.

(3) There exists no gray-color on the original (2) since strong yellow-color-fog covers its entire surface. It is however a crux in the technique that the tone on both of the whole and the specified parts of the picture are added gray-color besides the color tone of the entire surface of the picture is maintained when color separation is performed. This point is also a strong demand from the orderers. It is very difficult to meet such the demand in the present state of the conventional technique. It was however ascertained that color separation work may be carried out rational and purposively if the tonal conversion method of the present invention is introduced thereto.

It is also a crux in the color separation technique showing capability of rational removal of color-fog whether the point mentioned above can be rationally treated.

(4) Examining color-fog removal work from a viewpoint of the technology, the conventional color-fog removal work is not founded on a rational theory and is basically an empirical technique based on the trial and error while sophisticated electronic systems (color scanners) are used as working means. This invention is capable of substituting such the conventional technique with a rational technique having rulability, generality and flexibility.

We claim:

1. A method for conducting a tonal conversion of a picture upon producing a reproduced picture, said reproduced picture being free of color-fog, from an original color picture of continuous tone having color-fog thereon, which comprises the steps of:

(a) preparing density characteristic curves of respective red (R), green (G) and blue (B) photosensitive emulsion layers of a photosensitive color film material used for photographing the original color picture, each of said density characteristic curves being expressed in a coordinate system in which an axis of ordinates designated as D axis represents density values and an axis of abscissas designated as X axis represents pictorial information values on light exposure;

(b) designating a brightest area (H) and a darkest area (S) on the original color picture to measure the density values ($D_H$) of the brightest area (H) and the density values ($D_S$) of the darkest area (S) on the red (R), green (G) and blue (B) photosensitive emulsion layers respectively, by means of red (R), green (G) and blue (B) filters for cyan (C), magenta (M) and yellow (Y) color plates respectively and plotting the so-obtained density values ($D_H$) and ($D_S$) of the respective emulsion layers along the D axis;

(c) determining, from the density values ($D_n$) of the respective red (R), green (G) and blue (B) photosensitive emulsion layers in a range from the brightest area ($D_H$) to the darkest area ($D_S$) on the D axis, picture information values ($X_n$) ranging from the brightest area ($X_H$) to the darkest area ($X_S$) on the X axis for producing the cyan (C), magenta (M) and yellow (Y) color plates in accordance with the corresponding density characteristic curves of the red (R), green (G) and blue (B) photosensitive emulsion layers;

(d) obtaining pictorial information values at a desired number of control points out of the pictorial information values ($X_n$) of the respective color plates in the range from the brightest area ($X_H$) to the darkest area ($X_S$) on the X axis for controlling the tonal conversion of the original picture, and defining relative relations of the individual control points;

(e) determining, from the pictorial information values at the control points on the X axis, corresponding density values at a like number of control points on the D axis in the range from the brightest area ($D_H$) to the darkest area ($D_S$) in accordance with the corresponding density characteristic curves, and defining relative relations of the individual control points on the D axis;

(f) comparing the relative relations of the control points for the respective color plates in the range from the brightest area ($X_H$) to the darkest area ($X_S$) on the X axis with the relative relations of the corresponding control points in the range from the brightest area ($D_H$) to the darkest area ($D_S$) on the D axis, and obtaining objective data on the color-fog;

(g) converting the pictorial information values ($X_n$) for the respective color plates obtained in step (c) into halftone intensities (y) such as dot percentage values in accordance with the following formula:

$$y = y_H + \frac{\alpha(1 - 10^{-kx})}{\alpha - \beta} \cdot (y_S - y_H)$$

where x: a basic density value ($X_n - X_H$) obtained by measuring a density value ($D_n$), of a desired picture element on a color original having color-fog thereon, on the D axis by means of one of the color filters, projecting the measured density value ($D_n$) on the X axis in accordance with the density characteristic curve of a photosensitive emulsion layer corresponding to the color filter, determining a pictorial information value ($X_n$) on the X axis, determining, in a same manner, a pictorial information value ($X_H$) on the X axis for producing a corresponding color plate, said pictorial information value ($X_H$) corresponding to a density value ($D_H$) on the D axis of the brightest area on the color original picture, and subtracting said pictorial information value ($X_H$) from said pictorial information value ($X_n$);

y: a halftone intensity such as a dot area percentage of a picture element on a reproduced picture free of color-fog corresponding to a desired picture element on each of the color plates of the color original picture having color-fog thereon;

$y_H$: a halftone intensity such as a dot area percentage preset to either a density value ($D_H$) of the brightest area (H) or a corresponding pictorial information value ($X_H$) on the X axis upon measuring the color original picture by means of each of the color filters;

$y_S$: a halftone intensity such as a dot area percentage preset to either a density value ($D_S$) of the darkest area (S) on the D axis or a corresponding pictorial information value ($X_S$) on the X axis upon measuring the color original by means of each of the color filters;

$\alpha$: a surface reflectance of a base material used for expressing the reproduced picture thereon;

$\beta$: a value determined by $\beta = 10^{-\gamma}$;

k: a value determined by $\gamma/(X_S - X_H)$, where $X_S$ represents the pictorial information value on the X axis corresponding to a density value ($D_S$) on the D axis of the darkest area (S) obtained by measuring the color original picture by means of each of the color filters; and $\gamma$: a desired optional factor determined on the basis of the objective data obtained in step (f).

2. The method according to claim 1, wherein the density characteristic curve is a photographic characteristic curve expressed in a rectangular D-X coordinate system in which blackening degrees being densities (D) of the photosensitive color film material are plotted along the axis of ordinates designated as the D axis and logarithmic values (log E) of light exposures E are plotted along the axis of abscissas designated as the X axis.

3. The method according to claim 2, wherein the D-X rectangular coordinate system has identical scales graduated at an equal increment on the D and X axes thereof.

4. The method according to claim 1, wherein the reproduced picture is a halftone picture.

* * * * *